United States Patent

Kawasaki

Patent Number: 5,097,336
Date of Patent: Mar. 17, 1992

[54] SIGNAL PROCESSING APPARATUS

[75] Inventor: Somei Kawasaki, Tokyo, Japan

[73] Assignee: Canon Kabushiki Kaisha, Tokyo, Japan

[21] Appl. No.: 666,459

[22] Filed: Mar. 5, 1991

Related U.S. Application Data

[63] Continuation of Ser. No. 245,733, Sep. 16, 1988, abandoned.

[30] Foreign Application Priority Data

Sep. 22, 1987 [JP] Japan ................ 62-239468
Sep. 22, 1987 [JP] Japan ................ 62-239470

[51] Int. Cl.⁵ .................. H04N 5/21; H04N 5/92
[52] U.S. Cl. .................. 358/166; 358/167; 358/340
[58] Field of Search .................. 358/166, 167, 340

[56] References Cited

U.S. PATENT DOCUMENTS

| | | | |
|---|---|---|---|
| 4,451,746 | 5/1984 | Hirose et al. | 358/340 |
| 4,587,576 | 5/1986 | Hirota et al. | 358/340 |
| 4,626,927 | 12/1986 | Hirota et al. | 358/340 |
| 4,658,296 | 4/1987 | Beech | 358/166 |
| 4,698,696 | 10/1987 | Matsuo | 358/340 |
| 4,750,037 | 6/1988 | Kido et al. | 358/340 |
| 4,802,016 | 1/1989 | Kaneko | 358/340 |
| 4,825,297 | 4/1987 | Fuchsberger et al. | 358/37 |
| 4,849,826 | 7/1989 | Ohta | 358/166 |
| 4,860,105 | 8/1989 | Sakaguchi | 358/340 |

FOREIGN PATENT DOCUMENTS 114387 5/1987 Japan .

*Primary Examiner*—John W. Shepperd
*Attorney, Agent, or Firm*—Robin, Blecker, Daley & Driscoll

[57] ABSTRACT

A signal processing apparatus of this invention is an apparatus arranged to amplify a predetermined frequency component of an input signal on the basis of a predetermined amplification characteristic and then to output an amplified signal. This apparatus is arranged to separate a predetermined frequency component signal from an input signal; form a plurality of kinds of compressed signals by compressing the thus-separated signal on the basis of a plurality of kinds of compression characteristics which differ from one another; form a plurality of kinds of multiplied signals from the plurality of kinds of compressed signals; form an amplified signal, on the basis of the predetermined amplification characteristic, from the aforesaid input signal and the plurality of kinds of multiplied signals; and output the amplified signal. With this arrangement, it is possible to effect accurate amplification of the predetermined frequency component of the input signal on the basis of the predetermined amplification characteristic without being influenced by noise components.

2 Claims, 10 Drawing Sheets

SIGNAL PROCESSING APPARATUS

This is a continuation application under 37CFR 1.62 of prior application Ser. No. 245,733, filed Sept. 16, 1988 now abandoned.

BACKGROUND OF THE INVENTION

1. Field of the Invention

The present invention relates to a signal processing apparatus arranged to amplify a predetermined frequency component of a signal on the basis of a predetermined amplification characteristic prior to the transmission of the signal and to recover the original signal after the reception thereof.

2. Description of the Related Art

Various kinds of signal processing apparatus have heretofore been provided for the purpose of communicating information signals through transmission and reception thereof or by recording the information signals on a recording medium and reproducing the same therefrom.

As an example, a so-called still video apparatus is known which is arranged to record still image signals on a recording medium such as a magnetic disc, and reproduce the same therefrom, by means of a magnetic head. In recent years, as video tape recorders (VTRs) or other video equipment has been enhanced in image quality, there has arisen a strong demand for an improvement in the image quality of such a still video apparatus.

FIG. 1(a) shows the frequency allocation of a recorded signal which is formed by a current type of still video apparatus. As illustrated, a luminance signal which contains a synchronizing signal is frequency modulated into a high-frequency band signal (represented as YN in the figure), while a chrominance signal is frequency-modulated into a low-frequency band signal (represented as C in the figure) as a known color-difference line-sequential signal. Thus, the luminance signal and the chrominance signal are frequency-multiplexed to form the above-described recorded signal. In this case, the luminance signal is frequency-modulated such that the frequency $f_1$ of its sync. tip and the frequency $f_2$ of its white peak are 6.0 MHz and 7.5 MHz, respectively.

On the other hand, a so-called high-band system using an enhanced carrier frequency of a frequency-modulated luminance signal has been proposed as one method of enhancing image quality. As shown in FIG. 1(b), in the frequency allocation of a recorded signal which is formed by such a high-band system, its high-frequency end extends into a band which is high compared with that of the conventional system shown in FIG. 1(a). In accordance with the high-band system, as shown in FIG. 1(b), its luminance signal (represented as $Y_H$ in the figure) is frequency-modulated such that the frequency $f_3$ of its sync. tip and the frequency $f_4$ of its white peak are 8.0 MHz and 9.5 MHz, respectively.

However, if a recorded signal according to the above-described high-band system is to be formed by using a magnetic head and a magnetic disc which have the same construction as conventional ones, then the higher the frequency of the recorded signal, the lower the signal level of the same due to the electromagnetic conversion characteristics. Accordingly, to improve the S/N ratio of a reproduced signal, it becomes necessary to increase the amount of emphasis which has conventionally been affected on luminance signals.

FIG. 2 diagrammatically shows the essential construction of an apparatus for recording and reproducing still image signals in accordance with the above-described high-band system.

As illustrated, a luminance signal which contains a synchronizing signal is supplied to an input terminal 1, clamped, for example, at its sync. tip by a clamping circuit 2, and input to a non-linear emphasis circuit 3, in which the signal is subjected to non-linear emphasis. Further, the non-linearly emphasized signal is input to a linear emphasis circuit 4, in which the amount of emphasis applied to the signal is increased. Then, the signal is frequency-modulated in a frequency modulator 5, passed through a recording amplifier 6 and a switch 7, and recorded on a magnetic disc 9 by means of a magnetic head 8. During recording, the magnetic disc 9 is rotated once for each field period by means of a motor 10. Accordingly, still image signals corresponding to one field are recorded on each track which is formed concentrically on the magnetic disc 9.

In addition, since the magnetic head 8 is capable of traveling over the magnetic disc 9 in the radial direction thereof, still image signals for some tens of field images can be recorded over the magnetic disc 9.

During reproduction, a small reproduced signal which has been picked up by the magnetic head 8 is passed through the switch 7, amplified to a sufficient level by a pre-amplifier 11, and frequency-demodulated by a frequency demodulator 12. Then, the frequency-demodulated signal is passed through a linear de-emphasis circuit 13 which has the characteristics reverse to those of the linear emphasis circuit 4 so that the portion of that signal which has been emphasized by the linear emphasis circuit 4 during recording is suppressed. Subsequently, the signal is passed through a non-linear de-emphasis circuit 14 which has the characteristics reverse to those of the non-linear emphasis circuit 3 so that the portion of this signal which has been emphasized by the non-linear emphasis circuit 3 during the recording is suppressed. The resulting reproduced luminance signals are provided at an output terminal 15.

FIG. 3 is a block diagram of an example of the construction of the non-linear emphasis circuit 3 shown in FIG. 2. As illustrated, a luminance signal which has been supplied to the input terminal of the non-linear emphasis circuit 3 is transmitted through two separate paths. One of the signals passed through these two paths is applied directly to an adder 19, while the signal which has entered the other path is first passed through a high-pass filter (HPF) 16. A high-frequency band having a desired non-linear characteristic is extracted from the signal by the high-pass filter (HPF) 16 and then input to a compressor circuit 17. The extracted high-frequency band is subjected to compression which is weighted by the compressor circuit 17 in accordance with its input level. Then, the obtained non-linear characteristic is weighted by a multiplication-by-factor circuit 18 and applied to the adder 19, in which this multiplied signal is added to the above-described signal which has been input directly to the adder 19. In this manner, non-linear emphasis is affected on the luminance signal.

It is to be noted that, as shown in FIG. 5, the amount of emphasis varies according to whether or not the level of an input luminance signal is large.

FIG. 4 is a circuit diagram showing an example of a emphasis circuit which includes the non-linear emphasis circuit 3 and the linear emphasis circuit 4.

As illustrated, a luminance signal which has been clamped at the sync. tip of its synchronizing signal is supplied to an input terminal, passed through a high-pass filter constituted by a capacitor C4 and a resistor R12, and amplified by an amplifier of the common-base type constituted by a transistor Q5. A soft limiter circuit constituted by diodes $D_1$, $D_2$ and resistors R16, R17, R18, R19 and R20 is connected through a capacitor C5 to the collector of the transistor Q5.

FIG. 6 shows the voltage (V) - current (I) characteristic of the soft limiter circuit. As can be seen from this figure, if the level of an input luminance signal is small, the characteristic is determined by $r_1=R18=R19$, whereas, if the level is large, the characteristic is determined by $r_1=R20=R16//R17$. In this case, it is common practice that the relationship between $r_1$ and $r_2$ is set to $r_1>>r_2$. The variation of the characteristic is given by $$V_D - \frac{V_2 - V_1}{2}$$

where is the values of the respective diodes $D_1$ and $D_2$ when they are "on".

If the value of $V_2-V_1$ is determined by selecting resistors R22 and R23 and the resistors R20 and R22 are selected so that $R20/R22=2$ may be obtained, it is possible to cancel the drift, due to temperature, of the voltage $V_D$ of each of the diodes $D_1$ and $D_2$. The above-described operation of the soft limiter circuit causes the gain provided between the resistor R15 and the soft limiter circuit to vary in accordance with whether the level of an input luminance signal is large or small. The above-described circuit portion serves as the compressor circuit 17.

The input signal thus processed is then input to the emitter of the transistor Q3 through the emitter follower of a transistor Q4, a resistor R10 and a capacitor C3, while the luminance signal at the input terminal is also input to the emitter of the transistor Q3 through a resistor R9. These signals are amplified by the common-base type amplifier constituted by the transistor Q3, passed through the emitter of a transistor Q2, then through the linear emphasis circuit constituted by a capacitor C1 and resistors R2, R3, and developed at an output terminal via the emitter follower of the transistor Q1.

The value of the factor K of the multiplication-by-factor circuit 18 shown in FIG. 3 is determined by, for example, the values of the resistors R12, R15, R10 as well as the values of $r_1$ and $r_2$.

FIG. 7 is a block diagram showing one example of the construction of the non-linear de-emphasis circuit 14.

In this example, if the level of a signal applied to the input terminal shown in FIG. 3 is made equal to the level of a signal provided at the output terminal shown in FIG. 7, the transfer functions of the compressor circuits shown in FIGS. 3 and 7 equal each other. Therefore, if the open-loop gain of the differential amplifier 20 shown in FIG. 7 is sufficiently large, it follows that the transfer function of the non-linear de-emphasis circuit 14 is equal to the reciprocal of the transfer function of the non-linear emphasis circuit 3.

FIG. 8 is a circuit diagram showing an example of a de-emphasis circuit which includes the linear de-emphasis circuit 13 as well as the non-linear de-emphasis circuit 14 shown in FIG. 7.

As illustrated, the reproduced luminance signal which has been output from the frequency demodulator 12 is input to the base of a transistor Q7. The input signal is first passed through the linear de-emphasis circuit 13 which is constituted by resistors R26 and R27 as well as a capacitor C7 and which has the characteristics reverse to those of the linear emphasis circuit 4. The signal is then subjected to non-linear de-emphasis in the amplifier constituted by a transistor Q9. In this manner, the original luminance signal is reproduced at the emitter of a transistor Q10. A high-pass filter and a compressor circuit, both of which are completely equivalent to those used in the non-linear emphasis circuit 3 shown in FIG. 3, are connected to the emitter of the transistor Q10, and a signal component having a non-linearly emphasized characteristic is output from the emitter of the transistor Q4.

This signal is inverted by the inverting amplifier constituted by a transistor Q12, input to the base of a transistor Q11, and supplied from the emitter of the transistor Q11 through a resistor R35 to the emitter of a transistor Q9, whereby the feedback loop of the non-linear emphasis portion is formed. The value of the feedback factor is made equal to the value of the factor K used in the non-linear emphasis circuit 3 by selecting the values of, for example, resistors R37, R38 and R35.

In a case where recording based on the high-band system is carried out, the amount of emphasis is increased as described previously. However, it is common practice to increase the amount of non-linear emphasis in order to prevent overmodulation, which may cause known inverted white peaks or the like.

If it is desired to further increase the amount of non-linear emphasis, it is a simple matter to set the factor K of the multiplication-by-factor circuit 18 to a greater value.

However, in a system which has a low S/N ratio and in which deterioration in the high-frequency component may easily occur, for example, in the above-described electromagnetic conversion system including the magnetic head, the magnetic disc or the like, if the factor K of non-linear emphasis is set to a large value, the following problems will be encountered. A malfunction may easily occur in the non-linear de-emphasis circuit 14 from the influence of random noise produced during recording or reproduction, with the result that waveform distortion which is unstable with respect to time may easily occur in recovered signals. For this reason, since the value of the factor K is limited, it is difficult to achieve a great effect of improving the S/N ratio by non-linear emphasis.

Such a malfunction in the non-linear emphasis circuit 3 will be described below with reference to FIGS. 9(a) to 9(c).

FIG. 9(a) is a diagram showing the waveform of the input signal of the non-linear emphasis circuit 3, that is, the waveform of a luminance signal having a low S/N ratio which may be input during dubbing. It is assumed that the illustrated waveform is a stair-step waveform which contains random noise. FIG. 9(b) is a diagram showing the waveform of the output signal of the compressor circuit 17 in the non-linear emphasis circuit 3. FIG. 9(c) is a diagram showing the waveform of the output signal of the non-linear emphasis circuit 3.

When a waveform signal such as that shown in FIG. 9(a) is input to the non-linear emphasis circuit 3, the compressor circuit 17 in the non-linear emphasis circuit 3 outputs a differentiated-pulse waveform signal. As shown in FIG. 19(b), although the differentiated pulses generated during a predetermined time interval T should be originally equal in level, they become unequal by the influence of random noise.

More specifically, since the input signal supplied to the high-pass filter (HPF) 16 contains random noise, the differentiated-pulse waveform output from the high-pass filter (HPF) 16 assumes a signal waveform some portion of which increases or decreases in level due to the random noise and another portion of which does not increase or decrease in level since no noise component is produced. Such a signal is applied to the compressor circuit 17 and subjected to non-linear processing for affecting non-linear level suppression according to the level of a signal input to the compressor circuit 17. In the non-linear processing, an input signal whose level is smaller than a predetermined signal level is passed through the compressor circuit 17 without being processed, but an input signal whose level is larger than the predetermined signal level is suppressed by the compressor circuit 17. As a result, if fluctuations in level occur, due to random noise, in a differentiated pulse signal which is a signal input to the compressor circuit 17, it follows that the fluctuations in level occur in a corresponding differentiated pulse output from the compressor circuit 17.

As shown in FIG. 3, in the non-linear emphasis circuit 3, an input luminance signal is supplied to one input terminal of the adder 19, while a signal which is output from the compressor circuit 17 and which is multiplied by the factor K in the multiplication-by-factor circuit 18 is supplied to another input terminal of the adder 19. The adder 19 adds the former signal to the latter signal and outputs the result, whereby non-linear emphasis is affected.

In the non-linear emphasis circuit described above, if the high-frequency component signal output from the compressor circuit 17 fluctuates in level due to random noise, an error may be produced due to such level fluctuations in the process of the addition of the high-frequency component signal to the input luminance signal by the adder 19. As a result, as shown in FIG. 9(c), distortion will occur in the waveform after non-linear emphasis and, for example, the level of each spike pulse increases to an excessive degree or the waveform is partially rounded.

The degree of deterioration in the input luminance signal during non-linear emphasis due to the above-described random noise depends upon the value of the factor K used in the multiplication-by-factor circuit 18. More specifically, the larger the value of the factor K, the more the input luminance signal deteriorates when random noise occurs.

For the above reasons, in such a conventional emphasis circuit, it has been impossible to increase the value of the factor K which is used for multiplication by the multiplication-by-factor circuit 18, that is, the amount of non-linear emphasis. Accordingly, it has been difficult to enhance the S/N ratio.

Also, the above-described apparatus for recording and reproducing still image signals is provided with a dubbing function as an indispensable feature. In dubbing, image signals recorded on one recording medium have been reproduced at least once, and such image signals are again recorded on another recording medium. As a result, random noise which occurs during recording or reproduction causes a malfunction in the compressor circuit of the non-linear emphasis circuit incorporated in the still-image-signal recording and reproducing apparatus which serves as a receiving means. Accordingly, image signals having distorted waveforms are recorded on the recording medium, so that the image signals materially deteriorate each time one dubbing operation is carried out.

SUMMARY OF THE INVENTION

It is, therefore, a first object of the present invention to provide a signal processing apparatus which is capable of solving the above-described problems.

It is a second object of the present invention to provide a signal processing apparatus which is capable of affecting accurate amplification of a predetermined frequency component of an input signal on the basis of a predetermined amplification characteristic without being influenced by noise components.

It is a third object of the present invention to provide a signal processing apparatus which is capable of affecting stable recovery of signals without being influenced by noise components.

It is a fourth object of the present invention to provide a signal processing apparatus which is capable of stably recording information signals on a recording medium and of stably recovering information signals recorded on a recording medium, without being influenced by noise components.

To achieve the first and second objects of the present invention, in one embodiment thereof, there is provided a signal processing apparatus arranged to amplify a predetermined frequency component of an input signal on the basis of a predetermined amplification characteristic and then to output an amplified signal. The signal processing apparatus of this invention is provided with separating means for separating a predetermined frequency component signal from the input signal; a plurality of kinds of compressing means having individual compression characteristics which differ from one another, the respective compressing means being arranged to compress, on the basis of the individual compression characteristics, the predetermined frequency component signal which has been separated from the input signal by the separating means and then to output a plurality of kinds of compressed signals; multiplied-signal forming means for forming a plurality of kinds of multiplied signals from the plurality of kinds of compressed signals which have been provided by the plurality of kinds of compressing means; and amplified-signal forming means arranged to form an amplified signal, on the basis of the predetermined amplification characteristic, from the input signal and the plurality of kinds of multiplied signals which have been provided by the multiplied-signal forming means and then to output the amplified signal.

To achieve the third object of the present invention, in one embodiment thereof, there is provided a signal processing apparatus arranged to receive an amplified signal whose predetermined frequency component has been amplified on the basis of a predetermined amplification characteristics and then to recover an original signal from the amplified signal. This signal processing apparatus of this invention is provided with separating means for separating a predetermined frequency component signal from an input signal; a plurality of kinds of compressing means having individual compression characteristics which differ from one another, the respective compressing means being arranged to compress, on the basis of the individual compression characteristics, the predetermined frequency component signal which has been separated from the input signal by the separating means and then to output a plurality of kinds of compressed signal; feedback-signal forming means for forming a feedback signal from the plurality of kinds of compressed signals which have been provided by the plurality of kinds of compressing means; and recovering means for recovering an original signal from the input signal by using the input signal and the feedback signal which has been provided by the feedback-signal forming means.

To achieve the fourth object of the present invention, in one embodiment thereof, there is provided an information-signal recording and reproducing system arranged to record an information signal on a recording medium and to reproduce the information signal recorded on the recording medium. This system is provided with an information-signal recording apparatus and an information-signal reproducing apparatus. The information-signal recording apparatus includes the following elements: first high-frequency-component separating means for separating a high-frequency component signal from an information signal; a plurality of kinds of first compressing means having individual compression characteristics which differ from one another, the respective first compressing means being arranged to compress, on the basis of the individual compression characteristics, the high-frequency component signal which has been separated from the information signal by the first high-frequency-component separating means and then to output a plurality of kinds of first compressed signals; multiplied-signal forming means for forming a plurality of kinds of multiplied signals from the plurality of kinds of first compressed signals which have been provided by the plurality of kinds of first compressing means; amplified-information-signal forming means arranged to form an amplified information signal whose high-frequency component has been amplified on the basis of the predetermined amplification characteristics, from the information signal and the plurality of kinds of multiplied signals which have been provided by the multiplied-signal forming means; and recording means for recording on the recording medium the amplified information signal which has been formed by the amplified-information-signal forming means. The information-signal reproducing apparatus includes the following elements: reproducing means for reproducing the amplified-information-signal recorded on the recording medium; second high-frequency-component separating means for separating a high-frequency component signal from the amplified information signal which has been reproduced by the reproducing means; a plurality of kinds of second compressing means having individual compression characteristics which differ from one another, the respective second compressing means being arranged to compress, on the basis of the individual compression characteristics, the high-frequency component signal which has been separated from the amplified information signal by the second high-frequency-component separating means and then to output a plurality of kinds of second compressed signal; feedback-signal forming means for forming a feedback signal from the plurality of kinds of second compressed signals which have been provided by the plurality of kinds of second compressing means; and recovering means arranged to recover an original information signal from the amplified information signal by using the amplified information signal which has been reproduced by the reproducing means and the feedback signal which has been provided by the feedback-signal forming means.

The above and other objects and features of the invention will become apparent from the following detailed description of embodiments thereof taken in connection with the accompanying drawings.

DETAILED DESCRIPTION OF THE PREFERRED EMBODIMENTS

Preferred embodiments of the present invention will be described below with reference to the accompanying drawings.

Figure 10:
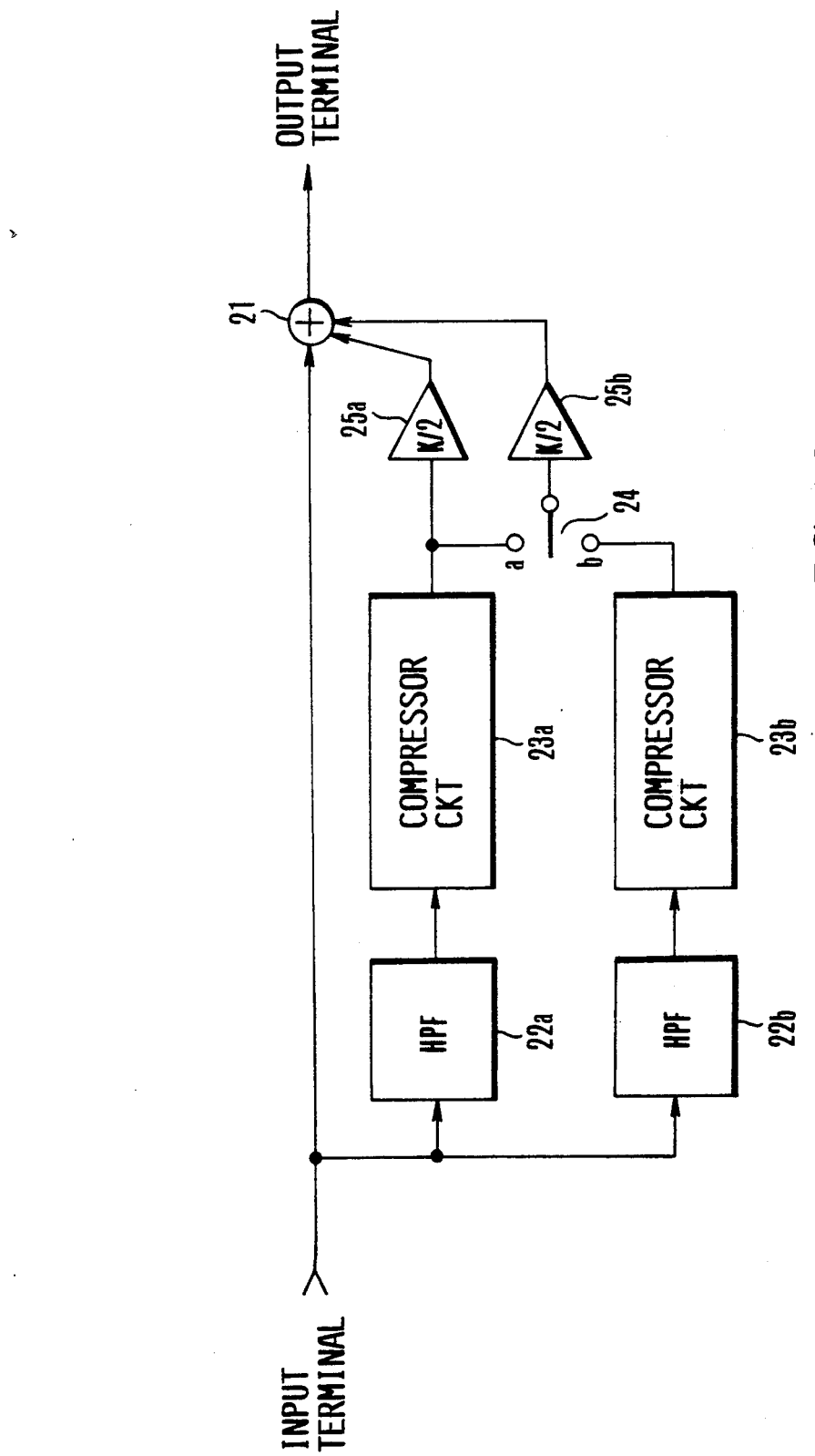
FIG. 10 is a schematic block diagram showing a non-linear emphasis circuit according to a first embodiment of the present invention.

FIG. 10 is a block diagram showing the essential construction of a non-linear emphasis circuit according to a first embodiment of the present invention.

Referring to FIG. 10, a luminance signal is supplied to an input terminal from an external circuit (not shown). In normal recording, a luminance signal which is relatively high in S/N ratio is supplied from a video camera, a video tuner or the like; while, in dubbing recording, a luminance signal having a low S/N ratio which has been reproduced by another reproducing apparatus is supplied. A system controller (not shown) connects a changeover switch 24 to a contact a in normal recording but to a contact b in dubbing recording.

First, the operation, in dubbing recording, of the non-linear emphasis circuit according to the first embodiment will be described below.

When a luminance signal which is relatively low in S/N ratio is applied to the input terminal, the luminance signal is supplied to an adder 21 and high-pass filters (HPFs) 22a and 22b.

Figure 3:
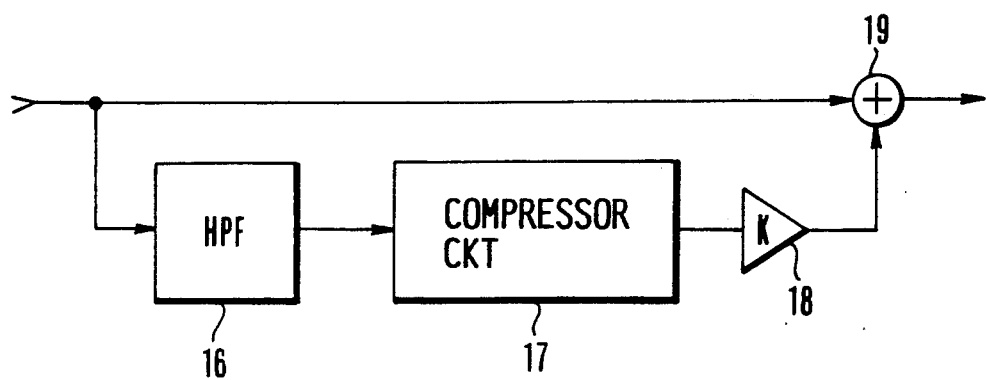
FIG. 3 is a schematic block diagram showing the construction of a conventional non-linear emphasis circuit.

The high-pass filters (HPFs) 22a and 22b have the same circuit constant as the high-pass filter (HPF) 16 shown in FIG. 3 described above, and a high-frequency component signal of the input luminance signal is extracted by each of the high pass filters 22a and 22b and then supplied to a corresponding compressor circuit 23a or 23b.

Figure 4:
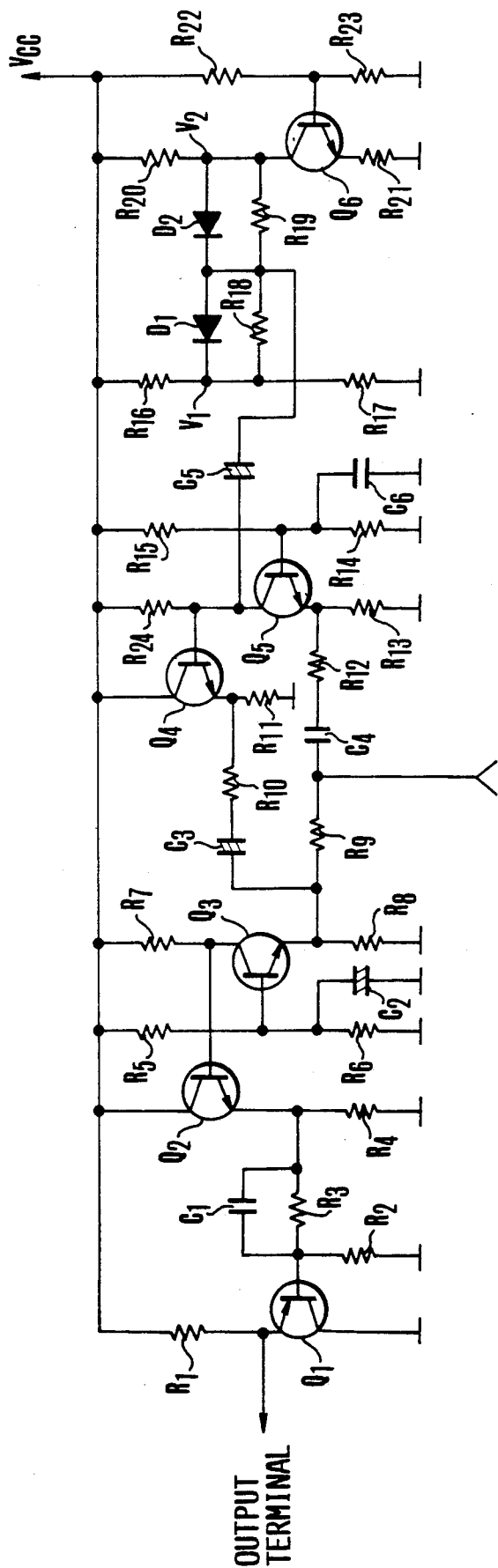
FIG. 4 is a circuit diagram showing one concrete example of a conventional emphasis circuit.
Figure 5:
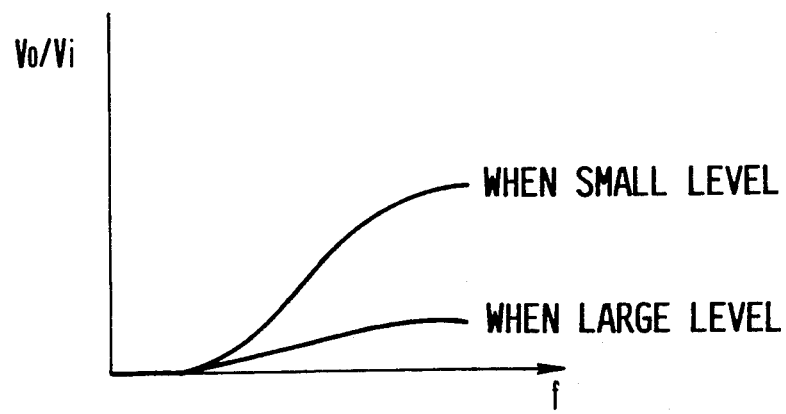
FIG. 5 is a graphic representation showing an example of the characteristic of the conventional non-linear emphasis circuit.

The circuit construction of each of the compressor circuits 23a and 23b is equivalent to that of the compressor circuit 17, and its concrete circuit construction is equivalent to that shown in FIG. 4. The high-frequency component signal is subjected to non-linear processing in each of the compressor circuits 23a and 23b and supplied to a corresponding multiplication-by-factor circuit 25a or 25b. In this operation, since the changeover switch 24 is connected to the contact b in FIG. 10, the output of the compressor circuit 23a and the output of the compressor circuit 23b are supplied through the changeover switch 24 to the multiplication-by-factor circuit 25a and the multiplication-by-factor circuit 25b, respectively.

Each of the multiplication-by-factor circuits 25a and 25b is a circuit for multiplying its input signal by a factor K/2. The high-frequency component signal is multiplied by the factor K/2 in each of the circuits 25a and 25b and then supplied to the adder 21.

In the adder 21, the input luminance signal which has already been supplied to the same is added to the high-frequency component signals which have respectively been subjected to the non linear processing and the multiplication-by-factor processing. Thus, the adder 21 outputs the resulting luminance signal which has been non-linearly emphasized.

The compression characteristics of the respective compressor circuits 23a and 23b are determined by the level ($V_2-V_1$ in FIG. 4) of the DC bias applied across the diodes $D_1$ and $D_2$ in the soft limiter circuit shown in the figure. The V—I characteristic of the soft limiter circuit is as shown in FIG. 6 described above.

Figure 6:
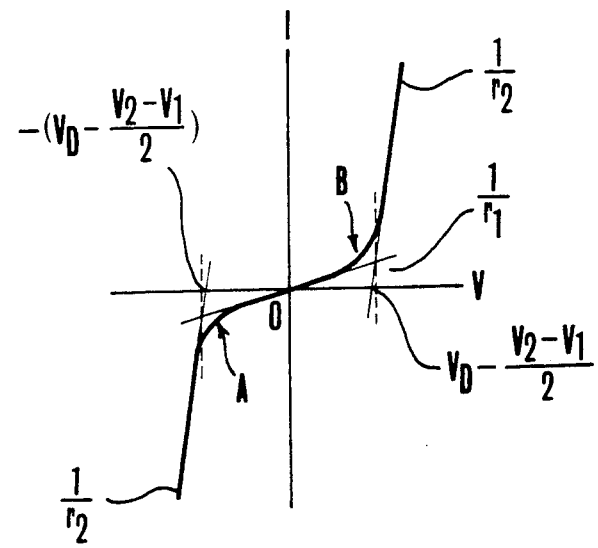
FIG. 6 is a graphic representation showing an example of the characteristic of a conventional soft limiter circuit.

As shown in FIG. 6, if, like a luminance signal which is input in dubbing recording, an input signal has a low S/N ratio and contains a large amount of random noise, a differentiated-pulse waveform signal which is the output signal of the random circuit easily fluctuates in level due to the random noise at portions A and B in FIG. 6. However, the characteristics of the portions A and B can be shifted along the voltage axis in accordance with the above-described DC bias level.

For this reason, the non-linear emphasis circuit according to the first embodiment is provided with the two compressor circuits 23a and 23b, as described above. The DC bias level with respect to the diodes $D_1$ and $D_2$ of each of the compressor circuits 23a and 23b is set to an appropriate level and thus the compressor circuits 23a and 23b are made different from each other in compression characteristic.

If the compressor circuits 23a and 23b having the mutually different compression characteristics as described above are employed, the respective compressor circuits 23a and 23b output non-linearly processed high-frequency component signals whose levels differ from each other because of the difference in compression characteristic therebetween, even if the high-frequency component signals supplied from the respective high-pass filters (HPFs) 22a and 22b contain similar random noise and as far as the level of the random noise is not excessively large.

The output signal of each of the compressor circuits 23a and 23b is multiplied by the factor K/2 in the corresponding multiplication-by-factor circuit 25a or 25b and then added to the input luminance signal in the adder 21. In this manner, the high-frequency component signals which have been non-linearly processed according to their random noise in the respective compressor circuits 23a and 23b and which have been multiplied by the factors K/2 in the respective multiplication-by-factor circuits 25a and 25b are reduced in level, whereby accurate non-linear emphasis is affected.

If a large level of random noise occurs in the high-frequency component signal supplied from each of the high pass filters (HPFs) 22a and 22b, the non-linearly processed high-frequency component signals which have been output from the respective compressor circuits 23a and 23b become substantially equal in level to each other. In consequence, the level of the high-frequency component signal which has been non-linearly processed according to its random noise and multiplied by the factors K/2 becomes substantially equal to the level of the high-frequency component signal which is obtained by a conventional non-linear emphasis circuit. It is possible, accordingly, to achieve non-linear emphasis the effect of which is at least equal to that of conventional non-linear emphasis.

The following is a description of the operation, in normal recording, of the non-linear emphasis circuit according to the first embodiment of the present invention.

In normal recording, as described above, the changeover switch 24 is connected to the contact a of FIG. 10 by the system controller (not shown), and an input luminance signal which is relatively high in S/N ratio is supplied to the adder 21 and the high-pass filter (HPF) 22a. The high-frequency component signal is extracted from the input luminance signal by the high-pass filter (HPF) 22a in the above-described manner, subjected to non-linear processing in the compressor circuit 23a, and supplied to the multiplication-by-factor circuits 25a and 25b via the changeover switch 24 which has been connected to the contact a shown in FIG. 10. Each of the multiplication-by-factor circuits 25a and 25b is a circuit for multiplying its input signal by the factor K/2. The respective signals are multiplied by the factors K/2 in the circuits 25a and 25b and then added to the input luminance signal in the adder 21.

It is to be noted that, in normal recording, since the multiplication-by-factor circuits 25a and 25b are adapted to multiply their input signals by the factors K/2, respectively, the circuit construction of the non-linear emphasis circuit according to the first embodiment is substantially equivalent to the construction of the conventional circuit shown in FIG. 3. In other words, in normal recording, a luminance signal which has been subjected to non-linear emphasis similar to that of the conventional non-linear emphasis circuit is output.

As described above, the first embodiment is provided with the two compressor circuits which differ from each other in compression characteristic and, in the case of non-linear emphasis for dubbing recording, these two compression circuits can be used to reduce malfunctions which occur in the compressor circuits due to random noise or the like, to affect stable non-linear emphasis;

thereby suppressing deterioration in luminance signals due to random noise. In normal recording, one of the two compressor circuits can be used to effect non-linear emphasis the effect of which is equivalent to that of a conventional non-linear emphasis circuit.

In addition, in the first embodiment, since the malfunctions of the compressor circuits due to random noise are reduced, the amount of emphasis can be increased by increasing the multiplication factor K used in non-linear emphasis.

By way of example, in the first embodiment, two compressor circuits are used to effect non-linear emphasis of input signals. If more than two compressor circuits are employed, the effect of the embodiment can be further enhanced.

The first embodiment has been described with illustrative reference to the non-linear emphasis circuit in the luminance-signal recording and reproducing apparatus. However, the present invention is not limited only to the processing of luminance signals, and can be applied to processing circuits for other kinds of information signal such as color-difference signals. In this case as well, it is possible to achieve effects similar to those described above.

As described above, in accordance with the first embodiment of the present invention, it is possible to reduce the influence of noise components contained in an input signal and hence to affect accurate amplification of a predetermined frequency component of the input signal on the basis of a predetermined amplification characteristic.

The following is a description of a second embodiment of the present invention.

Figure 7:
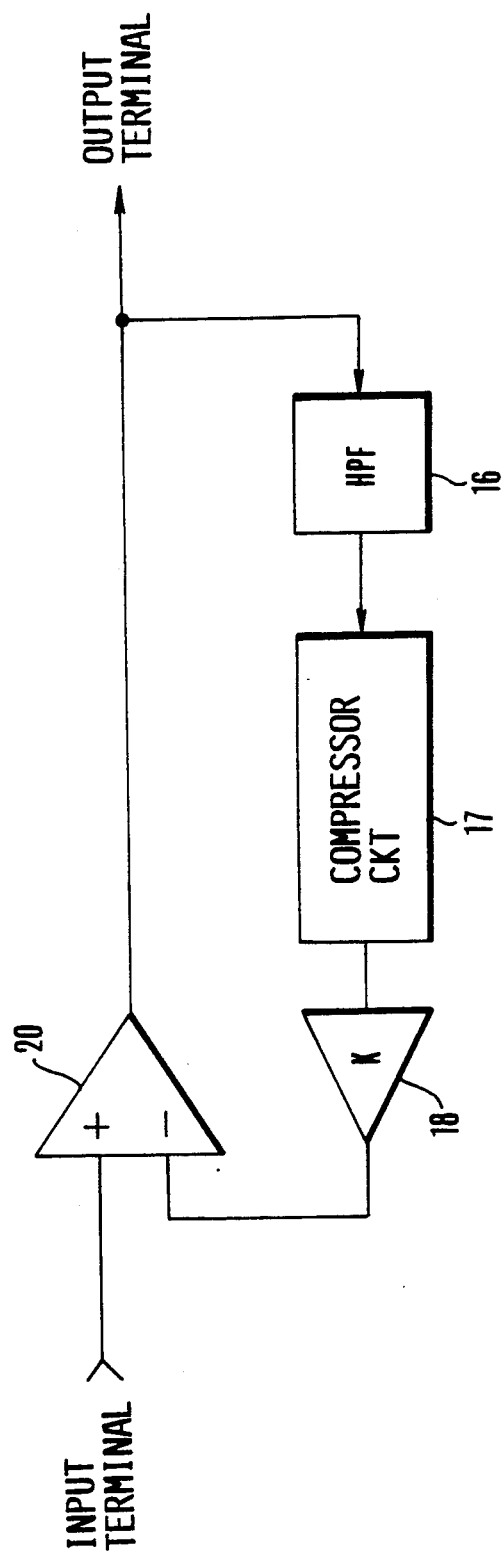
FIG. 7 is a schematic block diagram showing the construction of a conventional non-linear de-emphasis circuit.
Figure 11:
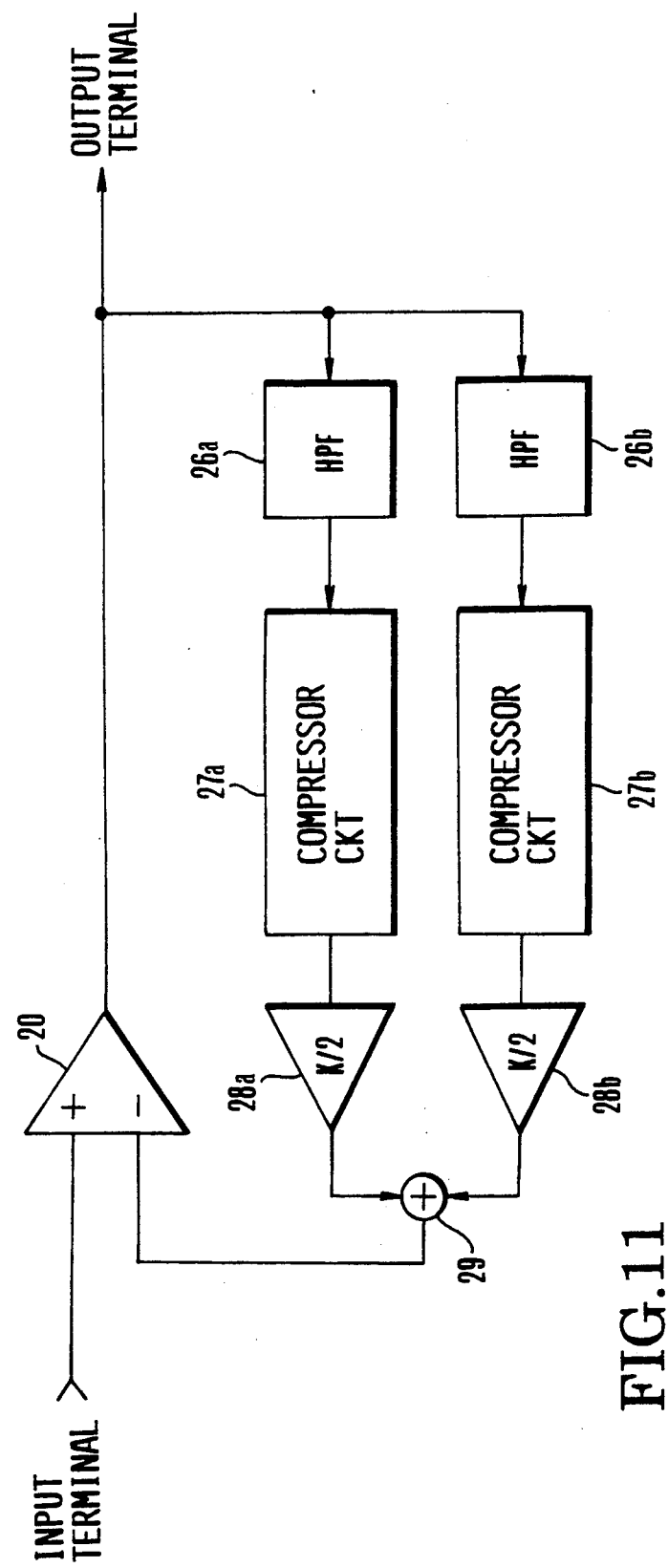
FIG. 11 is a schematic block diagram showing a non-linear de-emphasis circuit according to a second embodiment of the present invention.

FIG. 11 is a block diagram showing the essential construction of a non-linear de-emphasis circuit according to the second embodiment of the present invention. In FIG. 11, like reference numerals are used to denote the like or corresponding portions shown in FIG. 7, and detailed descriptions thereof are omitted.

Figure 1:
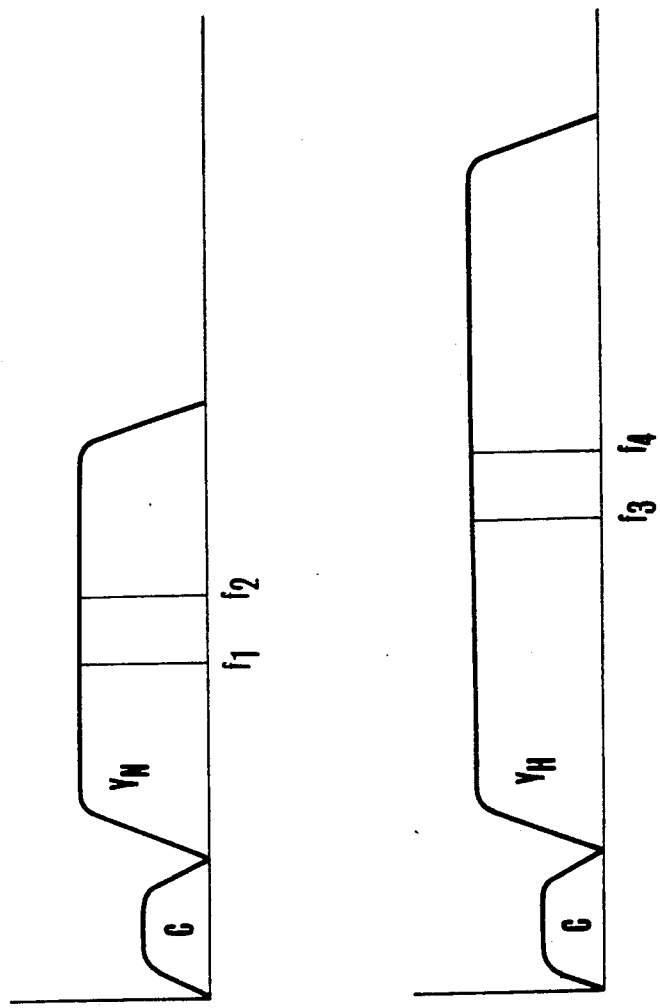
FIG. 1(a) shows the frequency allocation of a recorded signal which is formed by a conventional still video apparatus.
FIG. 1(b) shows the frequency allocation of a recorded signal which is formed by a high-band system.
Figure 2:
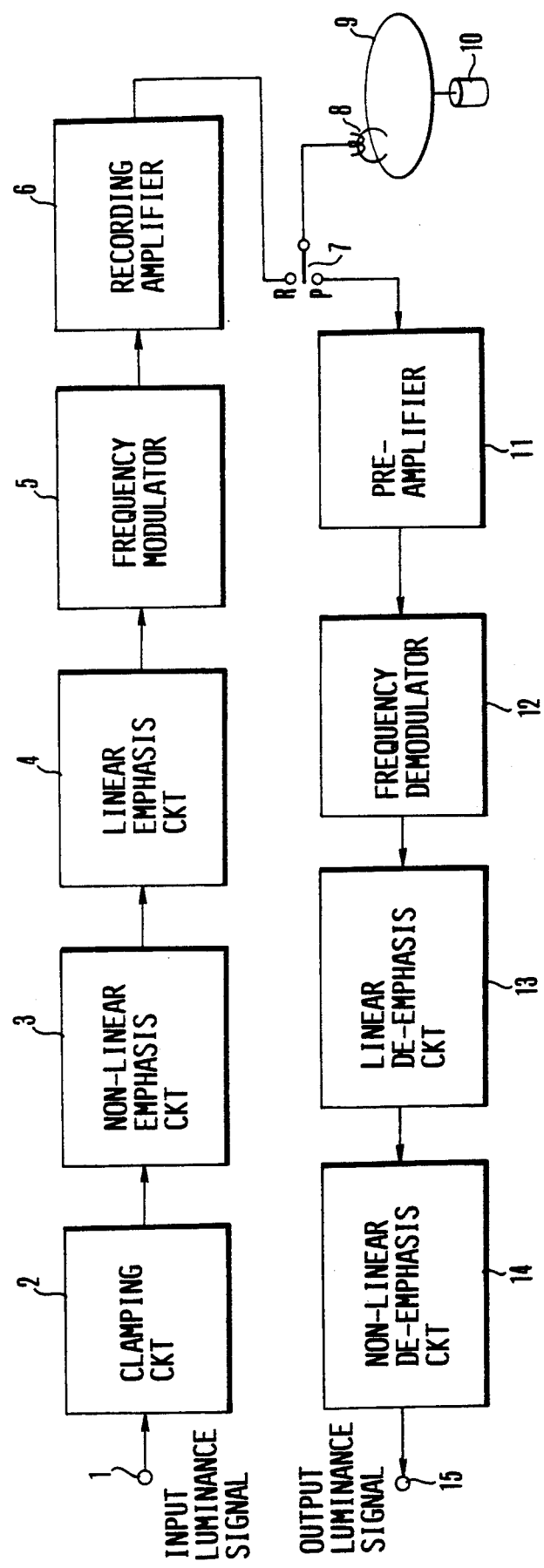
FIG. 2 is a schematic block diagram showing the construction of a conventional magnetic recording and reproducing apparatus.

Referring to FIG. 11, the reproduced luminance signal which has been linearly de-emphasized by the linear de-emphasis circuit 13 shown in FIG. 2 is supplied to an input terminal.

Figure 8:
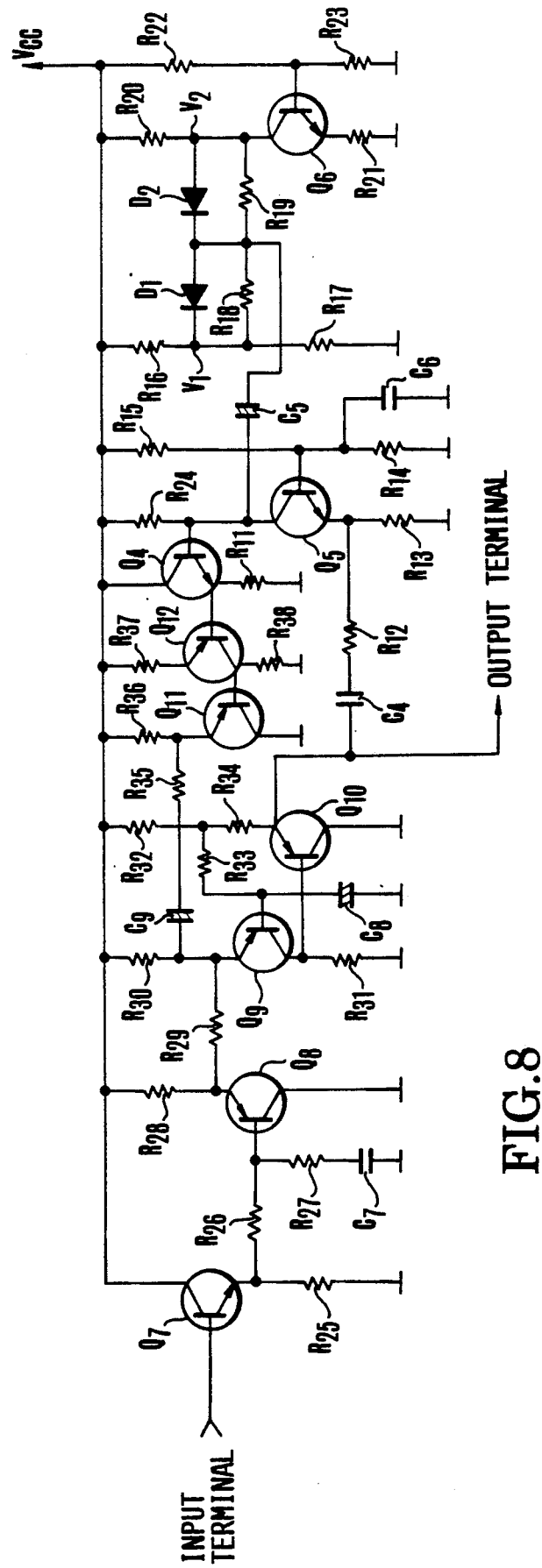
FIG. 8 is a circuit diagram showing one example of a conventional de-emphasis circuit.
Figure 9A:
FIGS. 9(a), 9(b) and 9(c) are waveform diagrams which respectively serve to illustrate the malfunction of the conventional non-linear emphasis circuit.
Figure 9B:
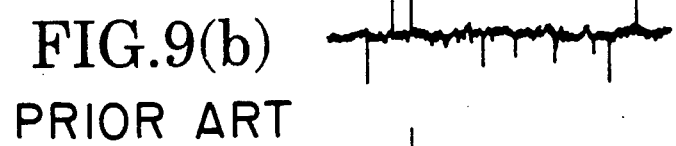
Figure 9C:
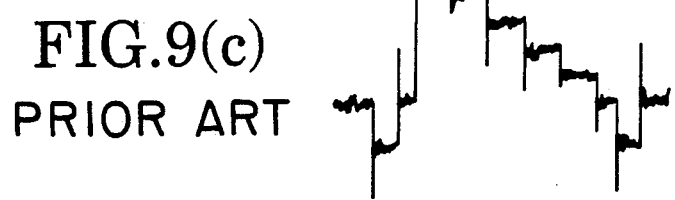

The input reproduced luminance signal is supplied to each of high-pass filters (HPFs) 26a and 26b via the differential amplifier 20. Each of the high-pass filters (HPFs) 26a and 26b, which has the same circuit constant as the high-pass filter (HPF) 16 shown in FIG. 7, extracts a high-frequency component signal from the reproduced luminance signal and supplies it to a corresponding compressor circuit 27a or 27b. The circuit construction of each of the compressor circuits 27a and 27b is equivalent to that of the compressor circuit 17 shown in FIG. 7, and its concrete circuit construction is equivalent to that shown in FIG. 8.

The high-frequency component signals which have been subjected to non-linear processing by the respective compressor circuits 27a and 27b are supplied to corresponding multiplication-by-factor circuits 28a and 28b. Each of the multiplication-by-factor circuits 28a and 28b is a circuit for multiplying its input signal by the factor K/2. The high-frequency component signals are multiplied by the factors K/2 in the respective circuits 28a and 28b, supplied to an adder 29, added therein, and supplied to the differential amplifier 20.

In the differential amplifier 20, the high-frequency component signal which is supplied to its minus terminal after subjected to the non-linear processing and the multiplication-by-factor processing is subtracted from the reproduced luminance signal supplied to the plus terminal of the differential amplifier 20. Thus, a reproduced luminance signal which has been non-linearly de-emphasized is output from the differential amplifier 20.

The compression characteristics of the respective compressor circuits 27a and 27b are determined by the level ($V_2 - V_1$ in FIG. 8) of the DC bias applied across the diodes $D_1$ and $D_2$ in the soft limiter circuit shown in the figure. The $V-I$ characteristic of the soft limiter circuit is as shown in FIG. 6 described above.

As shown in FIG. 6, a high-frequency component signal which is the output signal of each of the compression circuits easily fluctuates in level due to the random noise at the portions A and B in the figure. The characteristics of the portions A and B can be shifted along the voltage axis in accordance with the above-described DC bias level.

For this reason, similarly to the construction of the above-described non-linear emphasis circuit, the non-linear de-emphasis circuit according to the second embodiment is provided with the two compressor circuits 27a and 27b. The DC bias level with respect to the diodes $D_1$ and $D_2$ of each of the compressor circuits 27a and 27b is set to an appropriate level and thus the compressor circuits 27a and 27b are made to differ from each other in compression characteristic.

If the compressor circuits 27a and 27b having the mutually different compression characteristics as described above are employed, the respective compressor circuits 27a and 27b output non-linearly processed high-frequency component signals whose levels differ from each other because of the difference in compression characteristic therebetween, even if the high-frequency component signals supplied from the respective high-pass filters (HPFs) 26a and 26b contain similar random noise and as far as the level of the random noise is not excessively large.

The output signals of the respective compressor circuits 27a and 27b are multiplied by the factors K/2 in corresponding multiplication-by factor circuits 28a and 28b and then added together in the adder 29. In this manner, the high-frequency component signals which have been non-linearly processed according to their random noise in the respective compressor circuits 27a and 27b and which have been multiplied by the factors K/2 in the corresponding multiplication-by-factor circuits 25a and 25b are reduced in level, whereby accurate non-linear emphasis is affected.

If a large level of random noise occurs in the high-frequency component signal supplied from each of the high-pass filters (HPFs) 26a and 26b, the levels of the non-linearly processed high-frequency component signals which have been output from the respective compressor circuits 27a and 27b become substantially equal to each other. In consequence, the high-frequency component signal which has been non-linearly processed according to the random noise and multiplied by the factor K/2 becomes substantially equal in level to the high-frequency component signal which is obtained by a conventional non-linear emphasis circuit.

In addition, in the second embodiment, since the malfunctions of the non-linear de-emphasis circuit due to random noise are reduced, the amount of emphasis can be increased by increasing the multiplication factor K used in non-linear emphasis.

In the second embodiment, two compressor circuits are used to form a dual negative feedback loop for non-linear de-emphasis. If more than two compressor circuits are employed to form a multiple negative feedback loop, the effect of the embodiment can be further enhanced.

The second embodiment has been described with illustrative reference to the non-linear de-emphasis circuit in the luminance-signal recording and reproducing apparatus. However, the present invention is not limited only to the processing of luminance signals, and can be applied to processing circuits for other kinds of information signal such as color-difference signals. In this case as well, it is possible to achieve effects similar to those described above.

As described above, in accordance with the second embodiment of the present invention, it is possible to affect stable recovery of information signals without being influenced by noise components contained therein.

What is claimed is:

1. A signal emphasis apparatus for amplifying a predetermined frequency component of an input signal, on the basis of a predetermined amplification characteristic and for outputting the amplified signal, comprising:
   (A) separating means for separating a predetermined frequency component signal from an input signal;
   (B) compressing means, having a first compression mode in which the signal separated by said separating means is compressed on the basis of a first compression characteristic and a second compression mode in which the signal separated by said separating means is compressed on the basis of a second compression characteristic which is different from said first compression characteristic, for compressing said signal and outputting the compressed signal;
   (C) multiplying means for multiplying the signal output from said compressing means by a predetermined factor and outputting the multiplied signal;
   (D) adding means for adding the signal output from said multiplying means to the input signal; and
   (E) compression mode switching means for switching the compression mode of said compressing means between said first compression mode and said first and second compression modes, depending upon whether or not said input signal is a signal which has been reproduced from a recording medium of another apparatus.

2. A signal de-emphasis apparatus for receiving an amplified signal, a predetermined frequency component of which has been amplified on the basis of a predetermined amplification characteristic, at the time of transmitting said signal and for restoring said amplified signal to an original signal, comprising:
   (A) separating means for separating a predetermined frequency component signal from an input signal;
   (B) first compressing means for compressing the signal separated by said separating means on the basis of a first compression characteristic and outputting the compressed signal;
   (C) second compressing means for compressing the signal separated by said separating means on the basis of a second compression characteristic which is different from said first compression characteristic and outputting the compressed signal;
   (D) adding means for multiplying the signal output from said first compression means and the signal output from said second compression means by predetermined factors, respectively, and then adding the multiplied signals together and outputting the added signal; and
   (E) difference signal forming means for feeding-back the signal output from said adding means and for forming a difference signal indicative of the difference between the input signal and the signal fed back from said adding means.

* * * * *

UNITED STATES PATENT AND TRADEMARK OFFICE
CERTIFICATE OF CORRECTION

PATENT NO. : 5,097,336
DATED : March 17, 1992
INVENTOR(S) : Somei Kawasaki

It is certified that error appears in the above-indentified patent and that said Letters Patent is hereby corrected as shown below:

Col. 2, line 2      Change "affected" to -- effected --
Col. 2, line 18.    Change "de emphasis" to -- de-emphasis --
Col. 3, line 1.     Change "a" to -- an --
Col. 3, line 26.    After "where" insert -- $V_D$ --
Col. 3, line 26.    Change "values" to -- value --
Col. 5, line 18.    Change "affecting" to -- effecting --
Col. 5, line 39.    Change "affected" to -- effected --
Col. 6, line 18, 23. Change "affecting" to -- effecting --

UNITED STATES PATENT AND TRADEMARK OFFICE
CERTIFICATE OF CORRECTION

PATENT NO. : 5,097,336
DATED      : March 17, 1992
INVENTOR(S) : Somel Kawasaki

It is certified that error appears in the above-indentified patent and that said Letters Patent is hereby corrected as shown below:

Column 6, line 64, Change "characteristics" to --characteristic--.
Col. 9, line 34.  Change "non linear" to -- non-linear --
Col. 10, line 2.  Change "as far as" to -- as long as --
Col. 10, line 14. Change "affected" to -- effected --
Col. 10, line 17. Change "high pass" to -- high-pass --
Col. 10, line 68. Change "affect" to -- effect --
Col. 11, line 22. Change "signal" to -- signals --
Col. 11, line 28. Change "affect" to -- effect --
Col. 12, lines 28, 35. Change "characteristic" to -- characteristics --
Col. 12, line 38  Change "as far as" to -- as long as --
Col. 12, line 50  Change "affected" to -- effected --
Col. 13, line 13. Change "signal" to -- signals --
Col. 13, line 18  Change "affect" to -- effect --
Col. 14, line 15. Delete "of"

Signed and Sealed this

Third Day of August, 1993

*Attest:*

*Attesting Officer*

MICHAEL K. KIRK

*Acting Commissioner of Patents and Trademarks*